(12) United States Patent
Kamat

(10) Patent No.: US 11,876,718 B2
(45) Date of Patent: Jan. 16, 2024

(54) GRADED THROTTLING FOR NETWORK-ON-CHIP TRAFFIC

(71) Applicant: ADVANCED MICRO DEVICES, INC., Santa Clara, CA (US)

(72) Inventor: Narendra Kamat, Austin, TX (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 17/961,508

(22) Filed: Oct. 6, 2022

(65) Prior Publication Data
US 2023/0036142 A1    Feb. 2, 2023

Related U.S. Application Data

(63) Continuation of application No. 17/027,914, filed on Sep. 22, 2020, now Pat. No. 11,470,004.

(51) Int. Cl.
*H04L 47/127* (2022.01)
*H04L 43/067* (2022.01)
*H04L 43/0876* (2022.01)
*H04L 43/16* (2022.01)
*H04L 47/10* (2022.01)
*H04L 47/30* (2022.01)

(52) U.S. Cl.
CPC .......... *H04L 47/127* (2013.01); *H04L 43/067* (2013.01); *H04L 43/0876* (2013.01); *H04L 43/16* (2013.01); *H04L 47/29* (2013.01); *H04L 47/30* (2013.01)

(58) Field of Classification Search
None
See application file for complete search history.

(56) References Cited

U.S. PATENT DOCUMENTS

| | | | |
|---|---|---|---|
| 10,628,345 B2 | 4/2020 | McBride et al. | |
| 2011/0134933 A1* | 6/2011 | Eberle | H04L 49/102 370/412 |
| 2012/0331034 A1 | 12/2012 | Fawaz et al. | |
| 2014/0010079 A1* | 1/2014 | Monchiero | H04L 47/30 370/230 |
| 2014/0328172 A1 | 11/2014 | Kumar et al. | |
| 2015/0109916 A1 | 4/2015 | Locatelli et al. | |
| 2018/0039777 A1 | 2/2018 | Loh et al. | |
| 2022/0094641 A1 | 3/2022 | Kamat | |

OTHER PUBLICATIONS

International Search Report and Written Opinion, PCT/US2021/050917, dated Dec. 3, 2021, 12 pages.

* cited by examiner

*Primary Examiner* — Anh Ngoc M Nguyen

(57) ABSTRACT

Graded throttling for network-on-chip traffic, including: calculating, by an agent of a network-on-chip, a number of outstanding transactions issued by the agent; determining that the number of outstanding transactions meets a threshold; and implementing, by the agent, in response to the number of outstanding transactions meeting the threshold, a traffic throttling policy.

20 Claims, 9 Drawing Sheets

GRADED THROTTLING FOR NETWORK-ON-CHIP TRAFFIC

BACKGROUND

Chips such as systems-on-a-chip use a network-on-chip to facilitate communication between functional components. As traffic on the network-on-chip increases, the risk of degraded performance also increases.

DETAILED DESCRIPTION

Figure 1A:
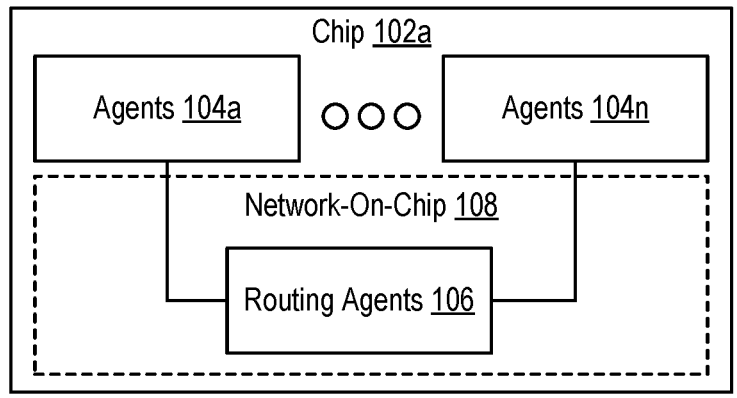
FIG. 1A is a block diagram of a chip for graded throttling for network-on-chip traffic according to some embodiments.

In some embodiments, a method of graded throttling for network-on-chip traffic includes, among other elements calculating, by an agent of a network-on-chip, a number of outstanding transactions issued by the agent. Such graded throttling also includes determining that the number of outstanding transactions meets a threshold. In response to determining that the number of outstanding transactions meets the threshold, the graded throttling may be carried out by implementing, by the agent, a traffic throttling policy.

In some embodiments, the number of outstanding transactions includes a difference between a number of issued transactions that have not received a response by the agent. In some embodiments, the threshold is included in a plurality of thresholds and the traffic throttling policy is included in a plurality of throttling policies. In such embodiments, implementing the transaction policy includes implementing the transaction policy based on which of the plurality of thresholds is met by the number of outstanding transactions. In some embodiments, the graded throttling for network-on-chip traffic includes recalculating the number of outstanding transactions issued by the agent and determining that the number of outstanding transactions falls below the threshold. Responsive to such a determination, the agent ends the traffic throttling policy. In some embodiments, ending the transaction policy includes implementing another throttling policy. In other embodiments, ending the transaction policy includes issuing transactions without throttling. In some embodiments, determining that the number of outstanding transactions falls below the threshold includes determining that the number of outstanding transactions falls below the threshold by a predefined amount.

In some embodiments, a chip for graded throttling for network-on-chip traffic performs steps including calculating, by an agent of a network-on-chip, a number of outstanding transactions issued by the agent. Such graded throttling also includes determining that the number of outstanding transactions meets a threshold. In response to determining that the number of outstanding transactions meets the threshold, the graded throttling may be carried out by implementing, by the agent, a traffic throttling policy.

In some embodiments, the number of outstanding transactions includes a difference between a number of issued transactions that have not received a response by the agent. In some embodiments, the threshold is included in a plurality of threshold and traffic throttling policy is included in a plurality of throttling policies. In such embodiments, implementing the transaction policy includes implementing the transaction policy based on which of the plurality of thresholds is met by the number of outstanding transactions. In some embodiments, the steps include recalculating the number of outstanding transactions issued by the agent and determining that the number of outstanding transactions falls below the threshold Responsive to such a determination, the agent ends the traffic throttling policy. In some embodiments, ending the transaction policy includes implementing another throttling policy. In other some embodiments, ending the transaction policy includes issuing transactions without throttling. In some embodiments, determining that the number of outstanding transactions falls below the threshold includes determining that the number of outstanding transactions falls below the threshold by a predefined amount.

In some embodiments, an apparatus for graded throttling for network-on-chip traffic includes a chip that performs steps including calculating, by an agent of a network-on-chip, a number of outstanding transactions issued by the agent. Such graded throttling also includes determining that the number of outstanding transactions meets a threshold. In response to determining that the number of outstanding transactions meets the threshold, the graded throttling may be carried out by implementing, by the agent, a traffic throttling policy.

In some embodiments, the number of outstanding transactions includes a difference between a number of issued transactions that have not received a response by the agent. In some embodiments, the threshold is included in a plurality of threshold and traffic throttling policy is included in a plurality of throttling policies. In such embodiments, implementing the transaction policy includes implementing the transaction policy based on which of the plurality of thresholds is met by the number of outstanding transactions. In some embodiments, the steps include recalculating the number of outstanding transactions issued by the agent and determining that the number of outstanding transactions falls below the threshold Responsive to such a determination, the agent ends the traffic throttling policy. In some embodiments, ending the transaction policy includes implementing another throttling policy. In other some embodiments, ending the transaction policy includes issuing transactions without throttling. In some embodiments, determining that the number of outstanding transactions falls below the threshold includes determining that the number of outstanding transactions falls below the threshold by a predefined amount.

FIG. 1A is a block diagram of a non-limiting example chip 102a. The example chip 102a can include a variety of chips, including microprocessors, integrated circuits, or systems-on-a-chip. The example chip 102a can be implemented in a variety of computing devices, including mobile devices, personal computers, peripheral hardware components, gaming devices, set-top boxes, and the like. The chip 102a includes a plurality of agents 104a-n. The agents 104a-n are functional units or hardware modules of the chip 102a. For example, in some embodiments, the agents 104a-n include various modules of a system-on-chip architecture.

To facilitate communication between agents 104a-n, the chip 102a also includes a plurality of routing agents 106. The routing agents 106 include hardware modules that switch and/or route traffic and/or messages between agents 104a-n. Accordingly, the routing agents 106 implement a network-on-chip 108. In some embodiments, the network-on-chip 108 includes a packet switching network of routing agents 106.

Communication between the agents 104a-n is decentralized in that no agent 104a-n has direct knowledge of the state (e.g., traffic generation, responses, queues, etc.) of other agents 104a-n and the routing agents 106, and there is no centralized entity managing the traffic generation and/or response behaviors of the agents 104a-n. Thus, the agents 104a-n have no direct knowledge of whether the network-on-chip 108 is being overloaded or approaching capacity for routing traffic and have no direct knowledge of whether or not to throttle traffic generation accordingly.

To improve performance of traffic via the network-on-chip 108, each agent 104a-n uses a number of outstanding transactions issued by that agent 104a-n as an estimate of the state of the network-on-chip 108. A number of outstanding transactions for a given agent 104a-n is a number of messages sent via the network-on-chip 108 to other agents 104a-n expecting a response (e.g., a response to a request, an acknowledgement of receipt) that has not been received. As communication via the network-on-chip 108 slows or the routing agents 106 are handling increased amount of traffic, the time for an agent 104a-n to respond to a message will increase. Accordingly, the number of outstanding transactions for a given agent 104a-n will increase assuming the rate of transaction generation for that agent 104a-n does not decrease.

In order to implement grading throttling for network-on-chip 108 traffic, an agent 104a-n will calculate a number of outstanding transactions issued by the agent 104a-n. The agent 104a-n will then compare the number to a threshold. Where the number falls below the threshold, the agent 104a-n will continue to generate traffic according to a currently implemented traffic throttling policy, if any. A traffic throttling policy is a configurable or programmable limit at which a given agent 104a-n generates traffic for the network-on-chip 108. Where the number exceeds the threshold, the agent 104a-n will implement a traffic throttling policy. For example, assume that an agent 104a-n is generating traffic for the network-on-chip 108 independent of any traffic throttling policy (e.g., without a limit). In response to the number of outstanding transactions for that agent 104a-n meeting a threshold, the agent 104a-n will then implement a traffic throttling policy to impose a limit on a rate at which the agent 104a-n provides traffic to the network-on-chip 108.

In some embodiments, the threshold is one of a plurality of thresholds and the traffic throttling policy is one of a plurality of traffic throttling policies. For example, in some embodiments, each traffic throttling policy corresponds to one of the plurality of thresholds such that, when the number of outstanding transactions for a given agent 104a-n exceeds a given threshold, the corresponding traffic throttling policy is implemented. For example, a first threshold corresponds to a first traffic throttling policy (e.g., a "light throttling policy"), a second threshold higher than the first threshold corresponds to a second traffic throttling policy more restrictive than the first traffic throttling policy (e.g., "a heavy throttling policy"), and a third threshold greater than the second threshold corresponds to a third traffic throttling policy where the agent 104a-n ceases to generate traffic (e.g., a "stop throttling policy").

Using this example, where the number of outstanding transactions for an agent 104a-n crosses the first threshold, the agent 104a-n will implement the light throttling policy. If the number of outstanding transactions for the agent 104a-n continues to increase even though the light throttling policy is implemented, and the number crosses the second threshold, the agent 104a-n will implement the heavy throttling policy. Should the number continue to increase and meet the third threshold, the stop throttling policy will be implemented.

The agent 104a-n will continually (e.g., at a predefined interval) recalculate the number of outstanding transactions for that agent. Where the number of outstanding transactions falls below the threshold (e.g., the last satisfied or crossed threshold), the agent 104a-n ends the currently implemented traffic throttling policy. In some embodiments, this includes removing any implemented traffic throttling policy and issuing traffic to the network-on-chip 108 without restriction. In other embodiments, this includes implementing another (e.g., a less restrictive) traffic throttling policy. Continuing with the example above, assuming an agent 104a-n is implementing a heavy throttling policy, where the number of outstanding transactions falls below the second threshold and is still above the first threshold, the agent 104a-n will implement the light throttling policy instead of the heavy throttling policy.

Were an agent 104a-n to end an implemented throttling policy when the number of outstanding transactions falls below the threshold, the number of outstanding transactions runs a risk of quickly increasing, thereby crossing the threshold again and causing the traffic throttling policy to be reimplemented. This would result in the agent 104a-n oscillating between implementing and ending a traffic throttling policy as the number of outstanding transactions oscillates between meeting and falling below the threshold. To prevent this, in some embodiments, an agent 104a-n ends an implemented throttling policy in response to the number of outstanding transactions falling below the corresponding threshold by a predefined amount. Continuing with the example above, assume that the first threshold is fifty outstanding transactions. Further assume that the number of outstanding transactions has exceeded the first threshold and that the light throttling policy is in place. Instead of removing the light throttling policy when the number of outstanding transactions falls below fifty, the agent 104a-n removes the light throttling policy when the number of outstanding transactions falls ten transactions below the threshold (e.g., forty outstanding transactions).

Figure 1B:
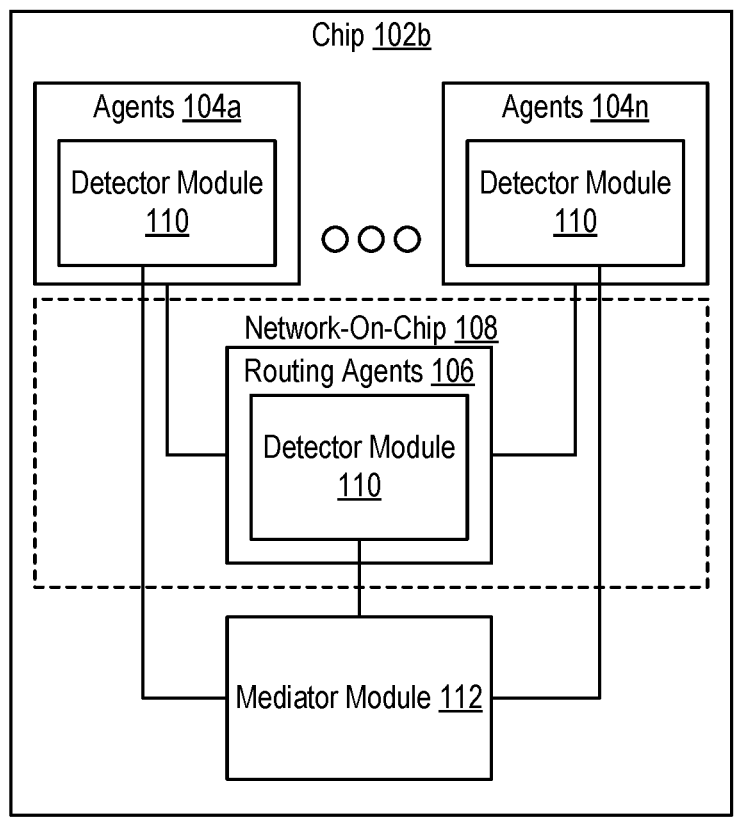
FIG. 1B is a block diagram of a chip for dynamic network-on-chip traffic throttling according to some embodiments.

FIG. 1B is a block diagram of a non-limiting example chip 102b. The example chip 102b is similar to the chip 102a of FIG. 1A in that the example chip 102b includes a plurality of agents 104a-n communicatively coupled via a network-on-chip 108 of a plurality of routing agents 106. In some embodiments, the agents 104a perform similar graded traffic throttling as was described with respect to FIG. 1A. The chip 102*b* differs from the chip 102*a* in that the chip 102*b* includes a plurality of detector modules 110. Detector modules 110 are hardware components included in or coupled to agents 104*a-n* and/or routing agents 106. Although FIG. 1B shows each agent 104*a-n* and the routing agents 106 as having corresponding detector modules 110, it is understood that, in some embodiments, the detector modules 110 are installed on or coupled to a subset of the agents 104*a-n* and/or routing agents 106. For example, in some embodiments, detector modules 110 are only included with the routing agents 106.

The detector modules 110 monitor their corresponding component (e.g., agents 104*a-n* and/or routing agents 106) to determine if a predefined condition is met. In some embodiments, the predefined condition includes a queue occupancy meeting a threshold. For example, a routing agent 106 maintains a queue of messages and/or packets to be routed. As network-on-chip 108 traffic increases to a rate greater than the rate at which the routing agent 106 processes messages, the queue will increase. Thus, the detector module 110 of the routing agent 106 determines if the queue occupancy of unrouted messages meets a threshold. As another example, the predefined condition includes network-on-chip 108 traffic being associated with a particular class of service. For example, a detector module 110 determines if traffic generated or routed by its corresponding component is of the particular class of service. In some embodiments, each component (e.g., agents 104*a-n* and/or routing agents 106) includes multiple detector modules 110. Each detector module 110 for a given component monitors a different predefined condition.

In response to the predefined condition being met, the detector module 110 (e.g., the detector module 110 that determined that the predefined condition is met) sends a signal to a mediator module 112. Each detector module 110 is communicatively coupled to the mediator module 112. For example, each detector module 110 has a direct signal path to the mediator module 112 outside of the routing agents 106. Thus, the signal to the mediator module 112 need not be routed via the routing agents 106 and potentially be subject to delay or slowdown in the network-on-chip 108.

In response to receiving the signal, the mediator module 112 sends an indication to a plurality of agents 104*a-n* to implement a traffic throttling policy. In some embodiments, the mediator module 112 sends the indication by asserting a signal on direct (e.g., unrouted) signal paths to each of the plurality of agents 104*a-n*. In other embodiments, the mediator module 112 sends the indication as a message sent via the routing agents 106. In some embodiments, the indication is sent to a subset of the agents 104*a-n* that generate traffic for the network-on-chip 108 (e.g., those agents 104*a-n* that issue transactions, excluding any agents 104*a-n* that only respond to other issued transactions). In some embodiments, the particular traffic throttling policy to be implemented is indicated in the signal or message sent to the agents 104*a-n*. In other embodiments, the traffic throttling policy is predefined or default.

By sending the indication to implement the traffic throttling policy, the mediator module 112 reduces network-on-chip 108 traffic when queue occupancy meets a threshold, indicating that the routing agents 106 are reaching capacity. Moreover, where traffic of a particular class of service is detected, the implemented traffic throttling policy will improve performance of the network-on-chip 108 and increase the overall quality of service when traffic of the particular class of service is being sent via the network-on-chip 108.

In some embodiments, an agent 104*a-n* receiving the indication to implement the traffic throttling policy determines to override the traffic throttling policy. Determining to override the traffic throttling policy includes implementing a different traffic throttling policy or implementing no traffic throttling policy. For example, an agent 104*a-n* generating traffic associated with a particular class of service will override the traffic throttling policy by implementing a less restrictive traffic throttling policy, or no traffic throttling policy. As another example, an agent 104*a-n* implementing a traffic throttling policy in response to a number of outstanding transactions meeting a threshold continues to implement its current traffic throttling policy, or implement a more restrictive traffic throttling policy than was indicated by the mediator module 112.

In some embodiments, the detector module 110 determines that the predefined condition is not met (e.g., no longer being met). The detector module 110 then indicates, to the mediator module 112, that the predefined condition is not met. For example, where the detector module 110 indicates that the predefined condition is met by asserting a signal on a communications path to the mediator module 112, indicating that the predefined condition is not met includes deasserting the signal. In other embodiments, indicating that the predefined condition is not met includes sending another signal to the mediator module 112 indicating that the predefined condition is not met. The mediator module 112 then causes the agents 104*a-n* (e.g., the agents 104*a-n* that received the indication to implement the traffic throttling policy) to end the traffic throttling policy. For example, in some embodiments, the mediator module 112 sends another signal to the agents 104*a-n* to end the traffic throttling policy. In other embodiments, the mediator module 112 deasserts a signal used to indicate that the traffic throttling policy should be implemented.

Although FIG. 1B describes functionality performed by a mediator module 112, it is understood that, in some embodiments, the functionality of the mediator module 112 may instead be performed by detector modules 110 of the routing agents 106 that communicate directly with the detector modules 110 of agents 104*a-n*.

Figure 2:
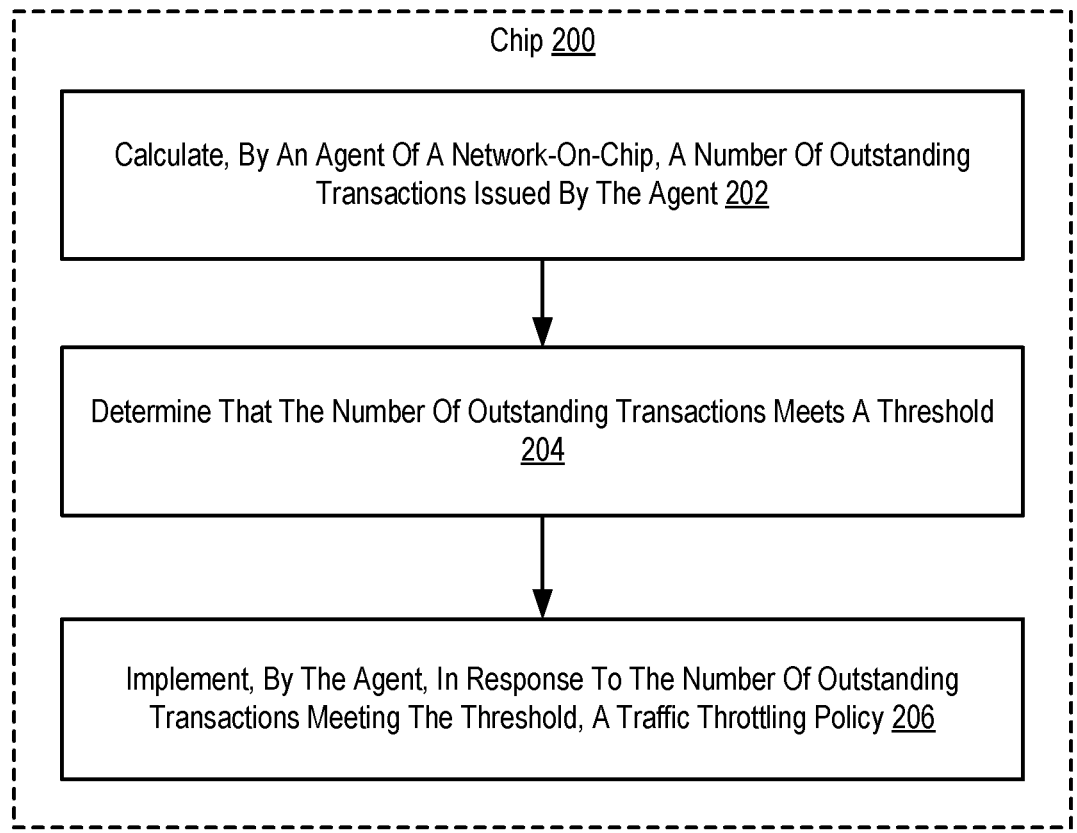
FIG. 2 is a flowchart of an example method for graded throttling for network-on-chip traffic according to some embodiments.

For further explanation, FIG. 2 sets forth a flow chart illustrating an exemplary method for graded throttling for network-on-chip traffic. The method of FIG. 2 is implemented in a chip 200, such as a chip 102*a* of FIG. 1A and/or a chip 102*b* of FIG. 1B. The method of FIG. 2 includes calculating 202, by an agent 104*a-n* of a network-on-chip 108 (e.g., communicatively coupled to a network-on-chip 108), a number of outstanding transactions issued by the agent 104*a-n*. A number of outstanding transactions for a given agent 104*a-n* is a number of messages sent via the network-on-chip 108 to other agents 104*a-n* expecting a response (e.g., a response to a request, an acknowledgement of receipt) that has not been received. As communication via the network-on-chip 108 slows or the routing agents 106 are handling increased amount of traffic, the time for an agent 104*a-n* to respond to a message will increase. Accordingly, the number of outstanding transactions for a given agent 104*a-n* will increase assuming the rate of transaction generation for that agent 104*a-n* does not decrease.

The method of FIG. 2 also includes determining 204 that the number of outstanding transactions meets a threshold. The method of FIG. 2 also includes implementing 206, by the agent 104*a-n*, in response to the number of outstanding transactions meeting the threshold, a traffic throttling policy. A traffic throttling policy is a configurable or programmable limit at which a given agent 104a-n generates traffic for the network-on-chip 108. For example, assume that an agent 104a-n in generating traffic for the network-on-chip 108 independent of any traffic throttling policy (e.g., without a limit). In response to the number of outstanding transactions for that agent 104a-n meeting a threshold, the agent 104a-n will then implement a traffic throttling policy to impose a limit on a rate at which the agent 104a-n provides traffic to the network-on-chip 108.

Figure 3:
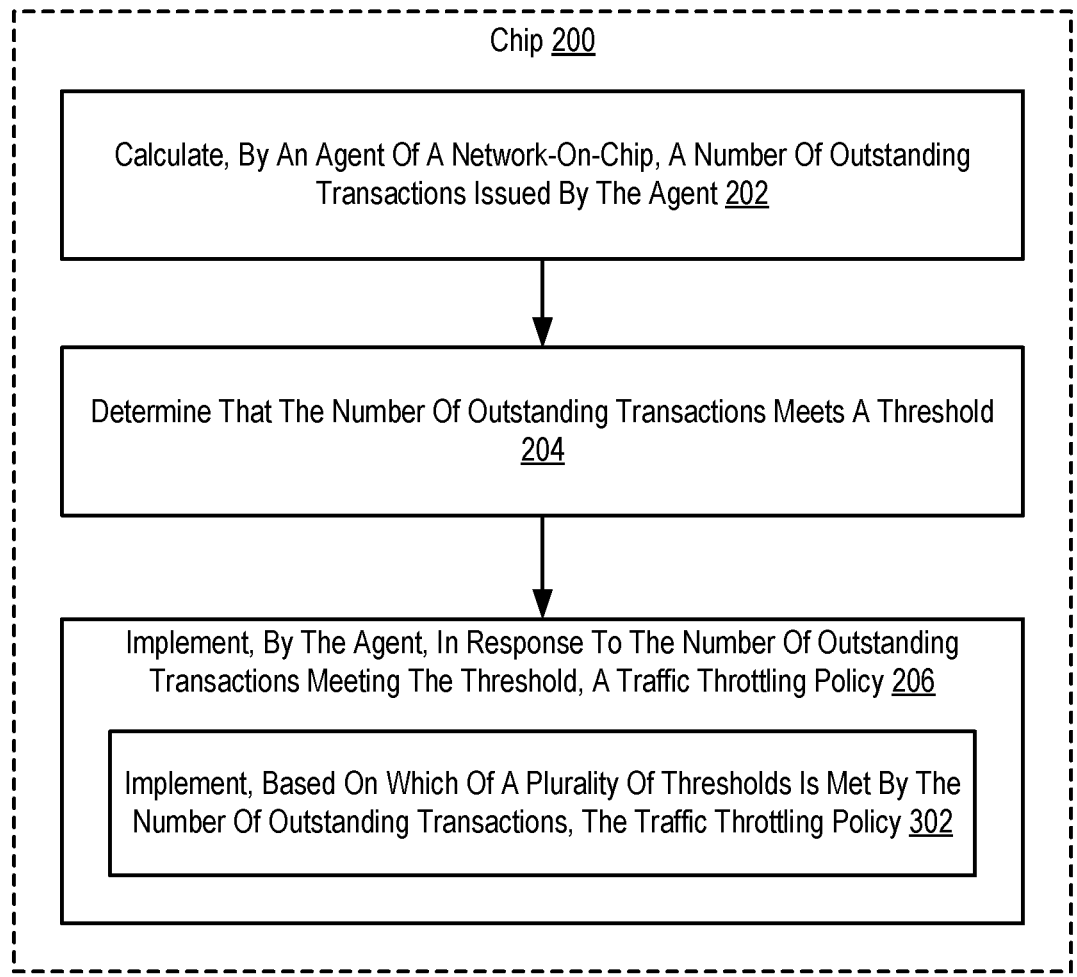
FIG. 3 is a flowchart of an example method for graded throttling for network-on-chip traffic according to some embodiments.

For further explanation, FIG. 3 sets forth a flow chart illustrating an exemplary method for graded throttling for network-on-chip traffic according to embodiments of the present disclosure. The method of FIG. 3 is similar to FIG. 2 in that the method of FIG. 3 includes calculating 202 a number of outstanding transactions issued by the agent 104a-n, determining 204 that the number of outstanding transactions meets a threshold, and implementing 206 a traffic throttling policy.

The method of FIG. 3 differs from FIG. 2 in that implementing 206, by the agent 104a-n, in response to the number of outstanding transactions meeting the threshold, a traffic throttling policy includes implementing 302, based on which of a plurality of thresholds is met by the number of outstanding transactions, the traffic throttling policy. For example, assume the threshold is one of a plurality of thresholds and the traffic throttling policy is one of a plurality of traffic throttling policies. Each traffic throttling policy corresponds to one of the plurality of thresholds such that, when the number of outstanding transactions for a given agent 104a-n exceeds a given threshold, the corresponding traffic throttling policy is implemented. For example, a first threshold corresponds to a first traffic throttling policy (e.g., a "light throttling policy"), a second threshold higher than the first threshold corresponds to a second traffic throttling policy more restrictive than the first traffic throttling policy (e.g., "a heavy throttling policy"), and a third threshold greater than the second threshold corresponds to a third traffic throttling policy where the agent 104a-n ceases to generate traffic (e.g., a "stop throttling policy").

Using this example, where the number of outstanding transactions for an agent 104a-n crosses the first threshold, the agent 104a-n will implement the light throttling policy. If the number of outstanding transactions for the agent 104a-n continues to increase even though the light throttling policy is implemented, and the number crosses the second threshold, the agent 104a-n will implement the heavy throttling policy. Should the number continue to increase and meet the third threshold, the stop throttling policy will be implemented.

Figure 4:
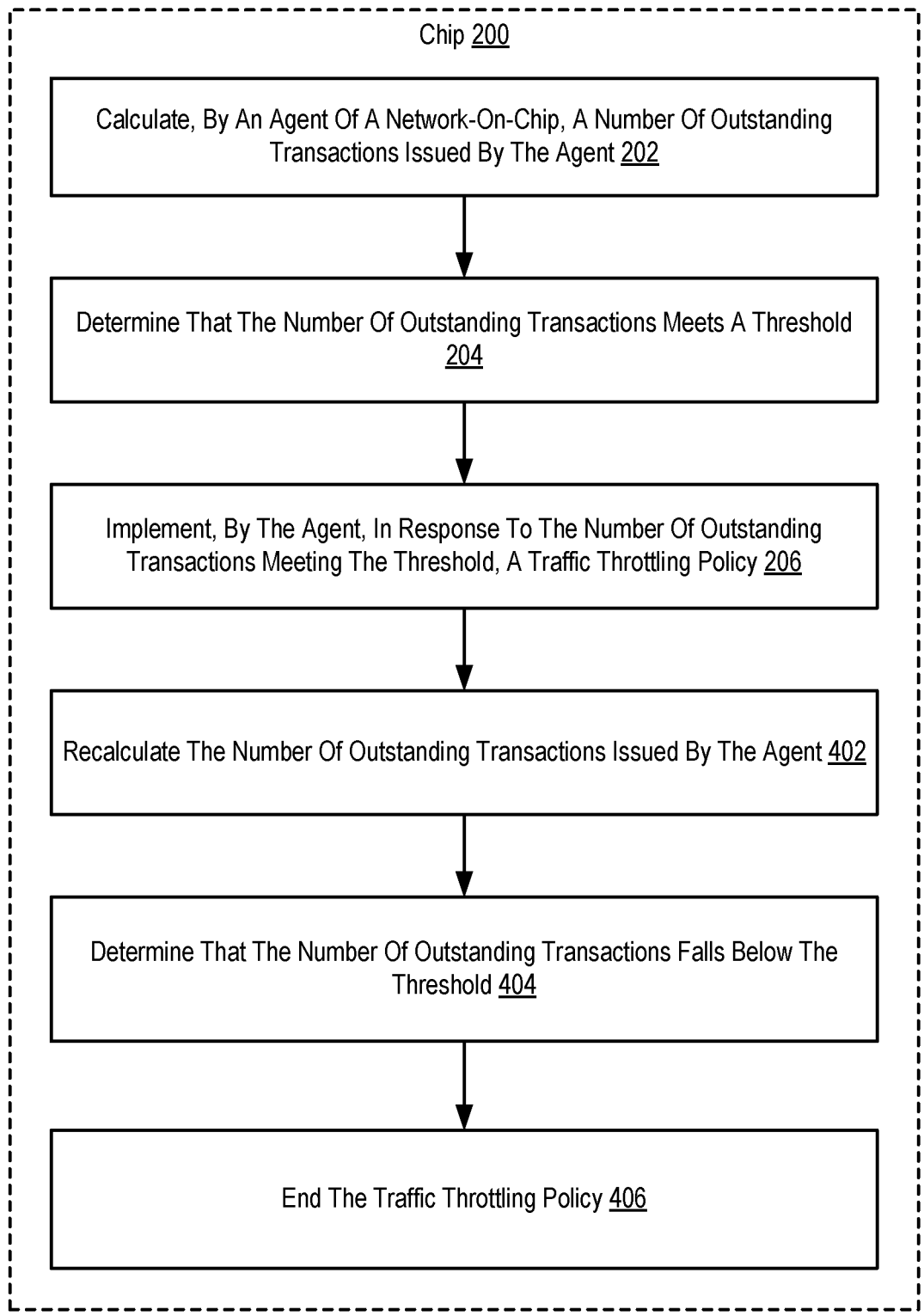
FIG. 4 is a flowchart of an example method for graded throttling for network-on-chip traffic according to some embodiments.

For further explanation, FIG. 4 sets forth a flow chart illustrating an exemplary method for graded throttling for network-on-chip traffic according to embodiments of the present disclosure. The method of FIG. 4 is similar to FIG. 2 in that the method of FIG. 4 includes calculating 202 a number of outstanding transactions issued by the agent 104a-n, determining 204 that the number of outstanding transactions meets a threshold, and implementing 206 a traffic throttling policy.

The method of FIG. 4 differs from FIG. 2 in that the method of FIG. 4 also includes recalculating 402 (e.g., by the agent 104a-n) the number of outstanding transactions issued by the agent 104a-n. For example, the agent 104a-n continually recalculates the number of outstanding transactions at a predefined interval, or in response to another event.

The method of FIG. 4 also includes determining 404 that the number of outstanding transactions falls below the threshold (e.g., the previously met threshold). In some embodiments, determining 404 that the number of outstanding transactions falls below the threshold includes determining that the number of outstanding transactions falls below the threshold for a predetermined amount of time (e.g., a predefined number of clock cycles). Thus, it is determined that the number of outstanding transactions remains below the threshold for an amount of time without again meeting or exceeding the threshold. FIG. 4 also includes ending 406 (e.g., in response to the number of outstanding transactions falling below the threshold) the traffic throttling policy. In some embodiments, ending 406 the traffic throttling policy includes removing any implemented traffic throttling policy and issuing traffic to the network-on-chip 108 without restriction. In other embodiments, ending 406 the traffic throttling policy includes implementing another (e.g., a less restrictive) traffic throttling policy. For example, where the number of outstanding transactions falls below the threshold but still exceeds another threshold, another traffic throttling policy corresponding to the other threshold is implemented.

Figure 5:
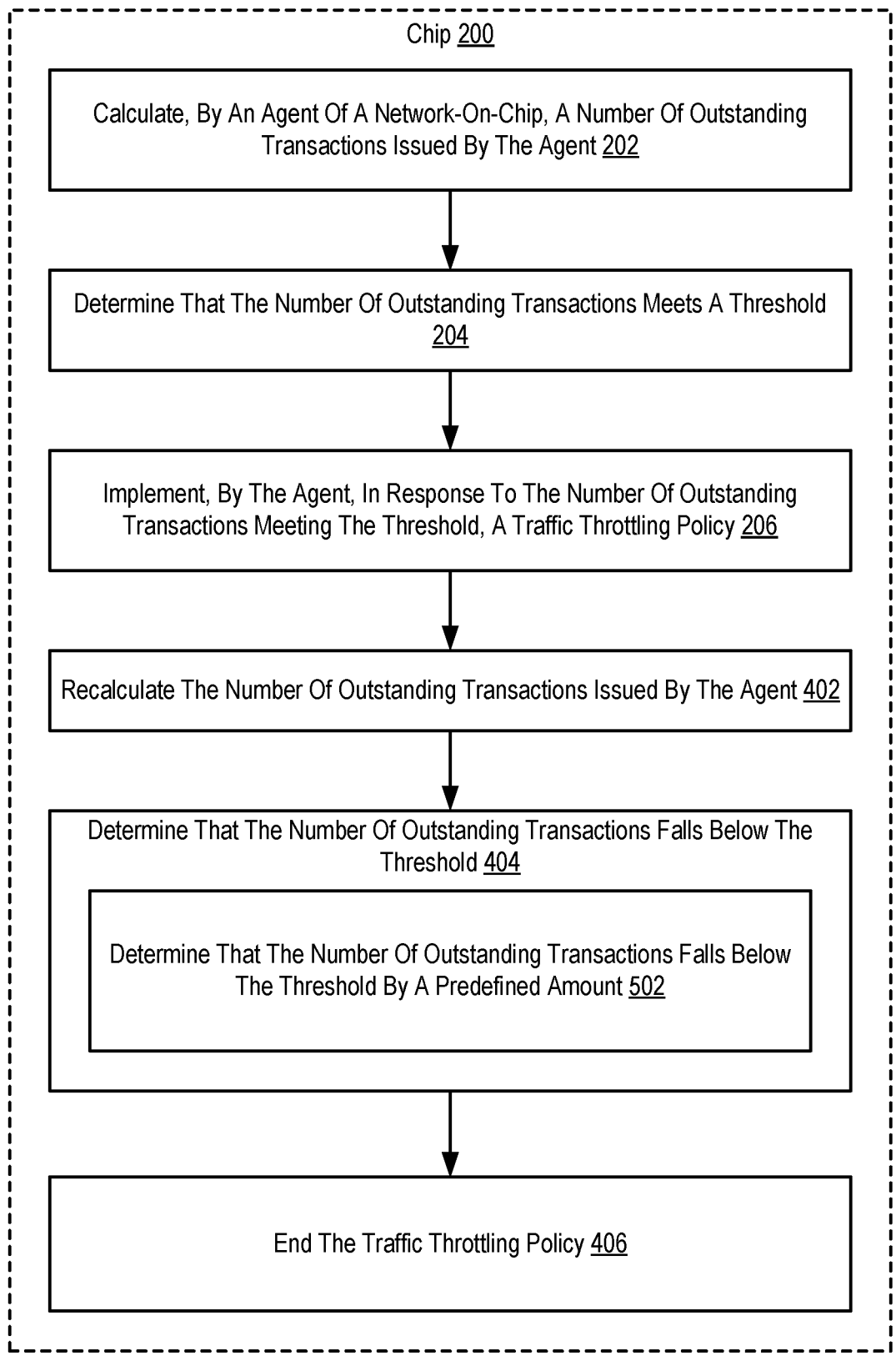
FIG. 5 is a flowchart of an example method for graded throttling for network-on-chip traffic according to some embodiments.

For further explanation, FIG. 5 sets forth a flow chart illustrating an exemplary method for graded throttling for network-on-chip traffic according to embodiments of the present disclosure. The method of FIG. 5 is similar to FIG. 4 in that the method of FIG. 5 includes calculating 202 a number of outstanding transactions issued by the agent 104a-n, determining 204 that the number of outstanding transactions meets a threshold, implementing 206 a traffic throttling policy, recalculating 402 the number of outstanding transactions, determining 404 that the number of outstanding transactions falls below the threshold, and ending 406 the traffic throttling policy.

FIG. 5 differs from FIG. 4 in that determining 404 that the number of outstanding transactions falls below the threshold includes determining 502 that the number of outstanding transactions falls below the threshold by a predefined amount. For example, assume that the threshold is fifty outstanding transactions. Further assume that the number of outstanding transactions has exceeded the first threshold and that a traffic throttling policy is in place. Instead of removing the traffic throttling policy when the number of outstanding transactions falls below fifty, the agent 104a-n removes the traffic throttling policy when the number of outstanding transactions falls ten transactions below the threshold (e.g., forty outstanding transactions). This prevents oscillating between implementing and ending a traffic throttling policy as the number of outstanding transactions oscillates between meeting and falling below the threshold.

Figure 6:
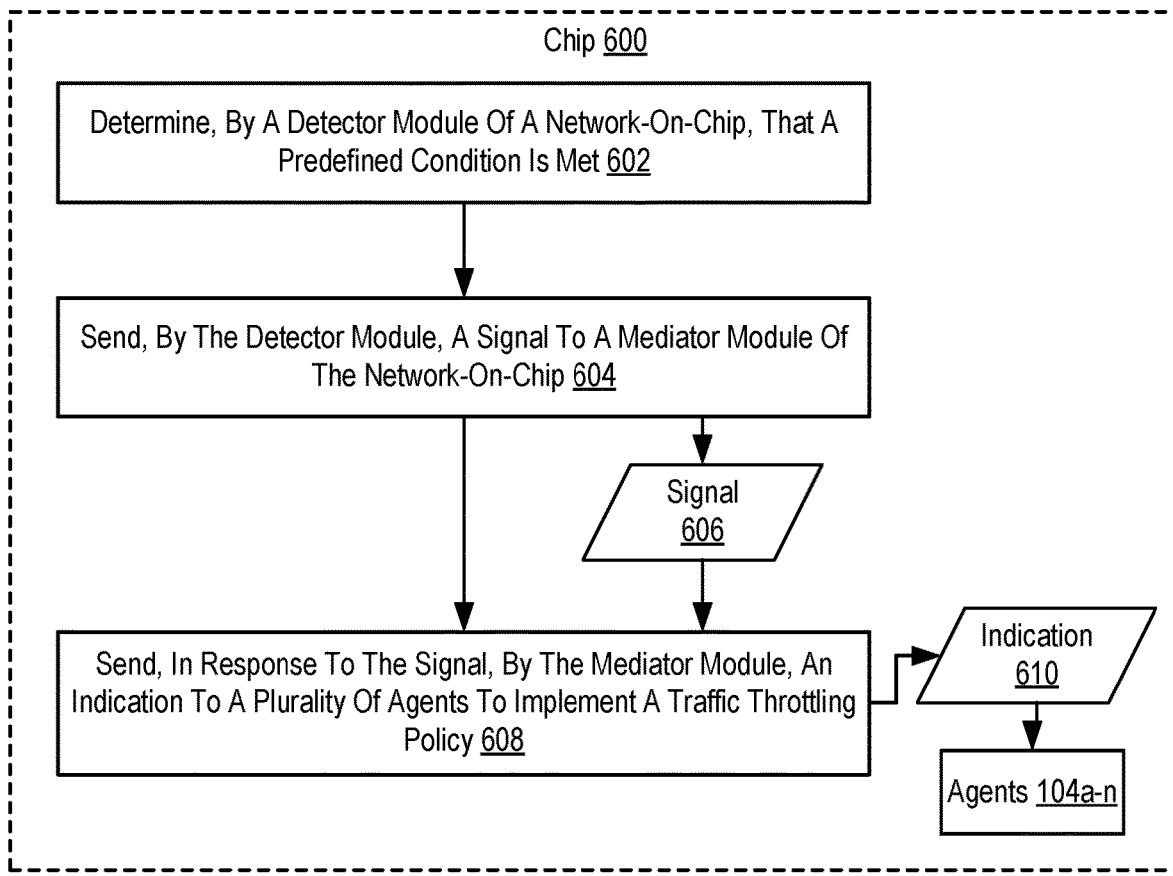
FIG. 6 is a flowchart of an example method for dynamic network-on-chip traffic throttling according to some embodiments.

For further explanation, FIG. 6 sets forth a flow chart illustrating an exemplary method for dynamic network-on-chip traffic throttling. The method of FIG. 6 is implemented in a chip 600, such as a chip 102a of FIG. 1A and/or a chip 102b of FIG. 1B. The method of FIG. 6 includes determining 602, by a detector module 110 of a network-on-chip 108 (e.g., corresponding to a component communicatively coupled to the network-on-chip 108), that a predefined condition is met. In some embodiments, the predefined condition includes a queue occupancy meeting a threshold. For example, a routing agent 106 maintains a queue of messages and/or packets to be routed. As network-on-chip 108 traffic increases to a rate greater than the rate at which the routing agent 106 processes messages, the queue will increase. Thus, the detector module 110 of the routing agent 106 determines if the queue occupancy of unrouted messages meets a threshold. As another example, the predefined condition includes network-on-chip 108 traffic being associated with a particular class of service. For example, a detector module 110 determines if traffic generated or routed by its corresponding component is of the particular class of service. In some embodiments, each component (e.g., agents 104a-n and/or routing agents 106) includes multiple detector modules 110. Each detector module 110 for a given component monitors a different predefined condition.

The method of FIG. 6 also includes sending 604, by the detector module 110, a signal 606 to a mediator module 112 of the network-on-chip 108. Each detector module 110 is communicatively coupled to the mediator module 112. For example, each detector module 110 has a direct signal path to the mediator module 112 outside of the routing agents 106. Thus, the signal 606 to the mediator module 112 need not be routed via the routing agents 106 and potentially be subject to delay or slowdown in the network-on-chip 108. Accordingly, sending 604 the signal 606 includes asserting the signal 606 on the signaling path to the mediator module 112.

The method of FIG. 6 also includes sending 608, in response to the signal 606, by the mediator module 112, an indication 610 to a plurality of agents 104a-n to implement a traffic throttling policy. In some embodiments, the mediator 112 sends the indication by asserting a signal on direct (e.g., unrouted) signal paths to each of the plurality of agents 104a-n. In other embodiments, the mediator module 112 sends the indication 610 as a message sent via the routing agents 106. In some embodiments, the indication 610 is sent to a subset of the agents 104a-n that generate traffic for the network-on-chip 108 (e.g., those agents 104a-n that issue transactions, excluding any agents 104a-n that only respond to other issued transactions). In some embodiments, the particular traffic throttling policy to be implemented is indicated in the signal or message sent to the agents 104a-n. In other embodiments, the traffic throttling policy is predefined or default.

Figure 7:
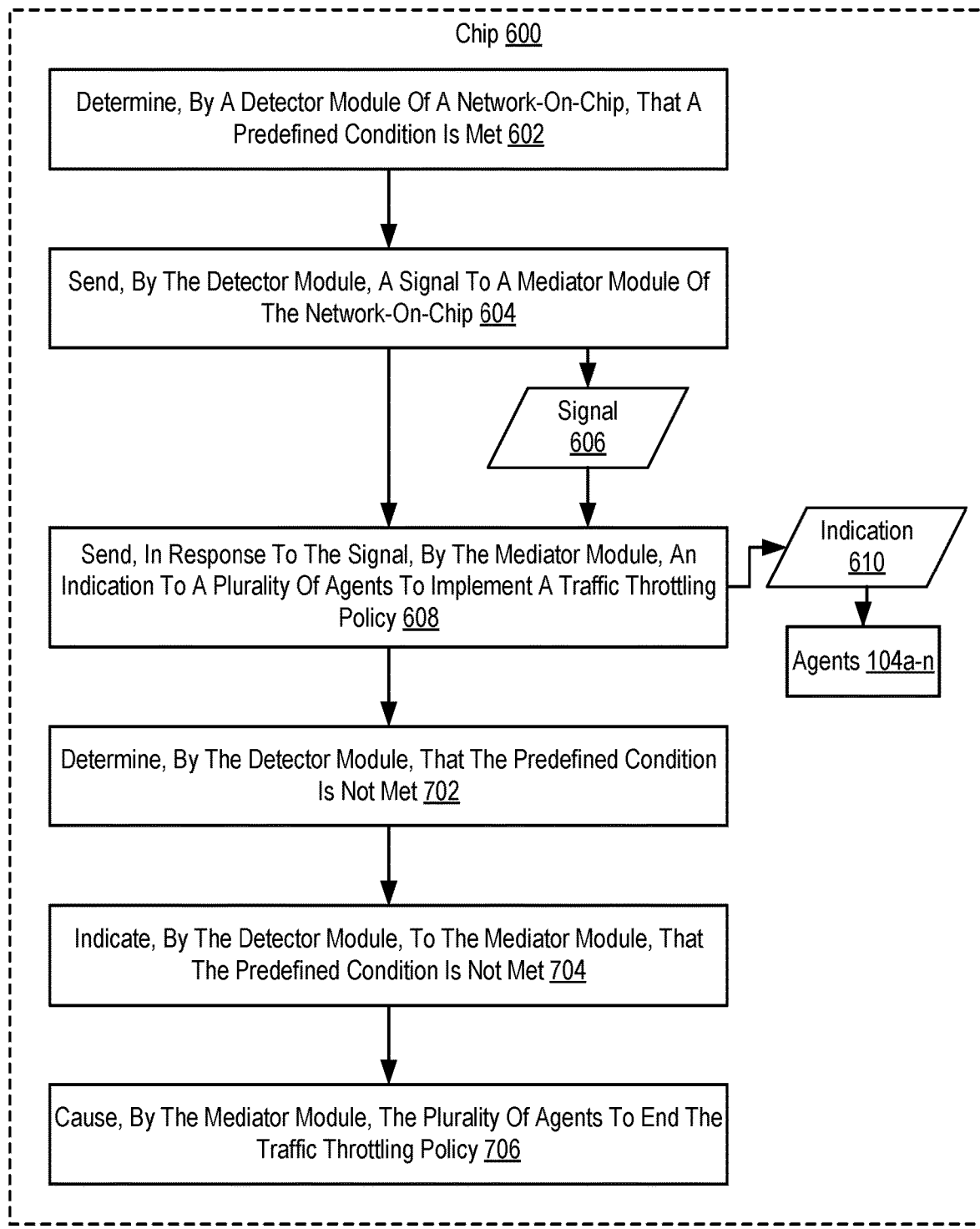
FIG. 7 is a flowchart of an example method for dynamic network-on-chip traffic throttling according to some embodiments.

For further explanation, FIG. 7 sets forth a flow chart illustrating an exemplary method for dynamic network-on-chip traffic throttling according to embodiments of the present disclosure. The method of FIG. 7 is similar to FIG. 6 in that the method of FIG. 7 includes determining 602 that a predefined condition is met, sending 604 a signal 606 to a mediator module 112, and sending 608, in response to the signal 606, an indication 610 to a plurality of agents 104a-n to implement a traffic throttling policy.

The method of FIG. 7 differs from FIG. 6 in that the method of FIG. 7 also includes determining 702, by the detector module 110, that the predefined condition is not met (e.g., no longer being met). The method of FIG. 7 also includes indicating 704, by the detector module 110, to the mediator module 112, that the predefined condition is not met. For example, where the detector module 110 indicates that the predefined condition is met by asserting a signal on a communications path to the mediator module 112, indicating that the predefined condition is not met includes deasserting the signal. In other embodiments, indicating that the predefined condition is not met includes sending another signal to the mediator module 112 indicating that the predefined condition is not met.

The method of FIG. 7 also includes causing 706, by the mediator module 112, the plurality of agents 104a-n (e.g., the agents 104a-n that received the indication to implement the traffic throttling policy) to end the traffic throttling policy. For example, in some embodiments, the mediator module 112 sends another signal to the agents 104a-n to end the traffic throttling policy. In other embodiments, the mediator module 112 deasserts a signal used to indicate that the traffic throttling policy should be implemented.

Figure 8:
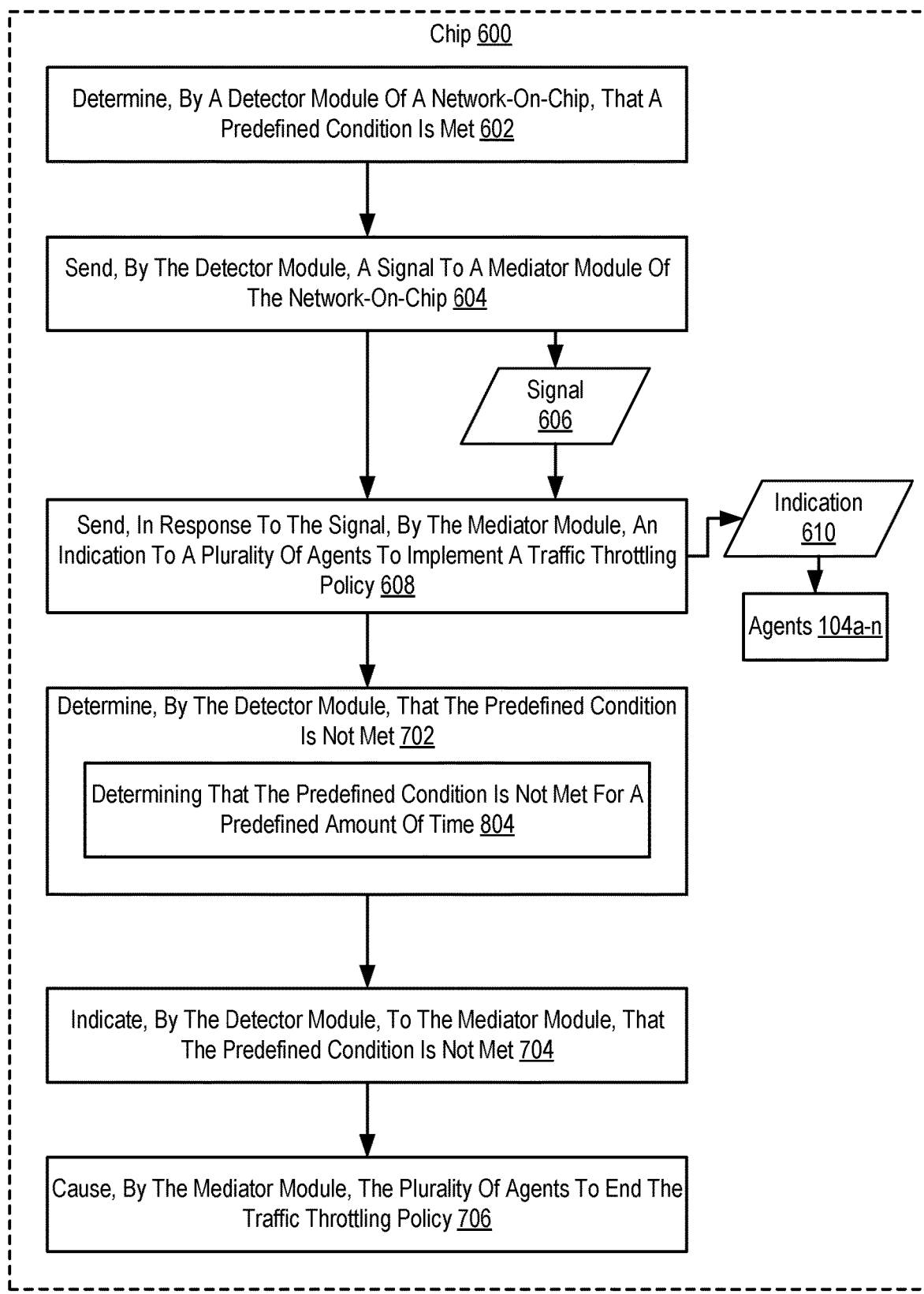
FIG. 8 is a flowchart of an example method for dynamic network-on-chip traffic throttling according to some embodiments.

For further explanation, FIG. 8 sets forth a flow chart illustrating an exemplary method for dynamic network-on-chip traffic throttling according to embodiments of the present disclosure. The method of FIG. 8 is similar to FIG. 7 in that the method of FIG. 8 includes determining 602 that a predefined condition is met, sending 604 a signal 606 to a mediator module 112, sending 608, in response to the signal 606, an indication 610 to a plurality of agents 104a-n to implement a traffic throttling policy, determining 702 that the predefined condition is not met, indicating 704 that the predefined condition is not met, and causing 706 the plurality of agents 104a-n to end the traffic throttling policy.

FIG. 8 differs from FIG. 7 in that determining 702, by the detector module 110, that the predefined condition is not met includes determining 804 that the predefined condition is not met for a predefined amount of time. The predefined amount of time is programmable or configurable. Thus, the mediator module 112 is not notified that the predefined condition is not met until the predefined amount of time has passed. This reduces the likelihood of the predefined condition oscillating between occurring and not occurring, thereby reducing the mediator module 112 causing oscillations between agents 104a-n implementing or not implementing a traffic throttling policy.

Figure 9:
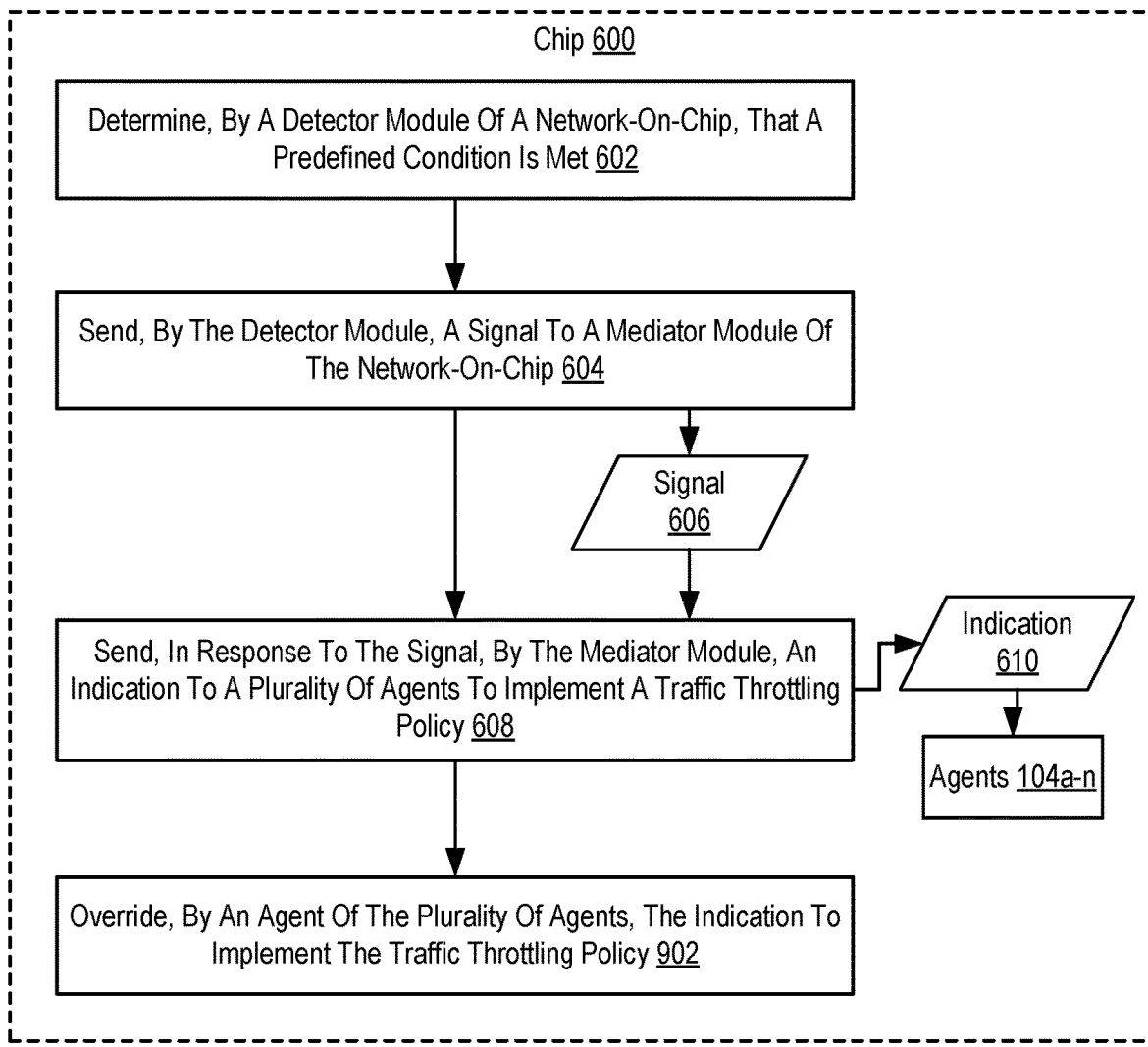
FIG. 9 is a flowchart of an example method for dynamic network-on-chip traffic throttling according to some embodiments.

For further explanation, FIG. 9 sets forth a flow chart illustrating an exemplary method for dynamic network-on-chip traffic throttling according to embodiments of the present disclosure. The method of FIG. 9 is similar to FIG. 6 in that the method of FIG. 9 includes determining 602 that a predefined condition is met, sending 604 a signal 606 to a mediator module 112, and sending 608, in response to the signal 606, an indication 610 to a plurality of agents 104a-n to implement a traffic throttling policy.

The method of FIG. 9 differs from FIG. 6 in that the method of FIG. 9 also includes overriding 902, by an agent 104a-n of the plurality of agents 104a-n, the indication 610 to implement the traffic throttling policy. In some embodiments, overriding 902 indication 610 to implement the traffic throttling policy includes implementing a different traffic throttling policy or implementing no traffic throttling policy. For example, an agent 104a-n generating traffic associated with a particular class of service will override the traffic throttling policy by implementing a less restrictive traffic throttling policy, or no traffic throttling policy. As another example, an agent 104a-n implementing a traffic throttling policy in response to a number of outstanding transactions meeting a threshold continues to implement its current traffic throttling policy, or implement a more restrictive traffic throttling policy than was indicated by the mediator module 112.

In view of the explanations set forth above, readers will recognize that the benefits of graded throttling for network-on-chip traffic include:
  Improved performance of a computing system by allowing for decentralized agents using a network-on-chip to self-regulate their traffic throttling.
  Improved performance of a computing system by throttling network-on-chip traffic according to network performance.

Exemplary embodiments of the present disclosure are described largely in the context of a fully functional computer system for graded throttling for network-on-chip traffic. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A chip with graded throttling for network-on-chip traffic, the chip comprising:
    a network-on-chip;
    a plurality of agents communicatively coupled to the network-on-chip;
    a detector circuit coupled to one or more of the plurality of agents, the detector circuit configured to determine that a predefined condition is met; and
    a mediator circuit coupled to the detector circuit and to one or more agents of the plurality of agents, the mediator circuit configured to:
        receive a signal that the predefined condition is met from the detector circuit; and
        transmit, in response to the signal from the detector circuit, an indication to implement a traffic throttling policy to the one or more agents of the plurality of agents using an unrouted signal path between the mediator circuit and the one or more of the plurality of agents.

2. The chip of claim 1, wherein the predefined condition comprises an occupancy of a queue of messages to be routed meeting a threshold.

3. The chip of claim 2, wherein the queue includes unrouted messages.

4. The chip of claim 1, wherein the predefined condition comprises network-on-chip traffic being associated with a particular class of service.

5. The chip of claim 1, wherein the detector circuit transmits the signal to the mediator circuit using a direct signal path between the detector circuit and the mediator circuit.

6. The chip of claim 1, wherein the indication sent from the mediator circuit to each of the one or more agents of the plurality of agents indicates the traffic throttling policy to implement.

7. The chip of claim 1, wherein the traffic throttling policy to implement is a predefined traffic throttling policy.

8. The chip of claim 1, wherein the detector circuit is further configured to determine that the predefined condition is not met and to send another signal from the detector circuit to the mediator circuit that the predefined condition is not met.

9. The chip of claim 8, wherein the mediator circuit is configured to transmit another indication to each of the one or more agents of the plurality of agents to end the traffic throttling policy in response to the another signal from the detector circuit.

10. The chip of claim 8, wherein determine that the predefined condition is not met comprises determining, by the detector circuit, that the predefined condition is not met for a predefined amount of time.

11. The chip of claim 1, wherein an agent that received the indication is configured to override the indication to implement the traffic throttling policy.

12. The chip of claim 11, wherein the agent that received the indication overrides the indication to implement the traffic throttling policy by implementing a different traffic throttling policy.

13. A method of graded throttling for network-on-chip traffic, the method comprising:
    determining, by a detector circuit of a network-on-chip that a predefined condition is met;
    sending a signal from the detector circuit to a mediator circuit; and
    sending, in response to the signal, an indication to implement a traffic throttling policy from the mediator circuit to each of a plurality of agents using an unrouted signal path between the mediator circuit and each of the plurality of agents.

14. The method of claim 13, wherein the predefined condition comprises an occupancy of a queue of messages to be routed meeting a threshold.

15. The method of claim 13, wherein the predefined condition comprises network-on-chip traffic being associated with a particular class of service.

16. The method of claim 13, wherein the signal sent from the mediator circuit to each of the plurality of agents includes the traffic throttling policy to implement.

17. The method of claim 13, further comprising:
    determining, by the detector circuit, that the predefined condition is not met;
    sending another signal from the detector circuit to the mediator circuit that the predefined condition is not met; and
    sending another signal from the mediator circuit to each of the plurality of agents to end the traffic throttling policy.

18. The method of claim 17, wherein determining, by the detector circuit, that the predefined condition is not met comprises:
    determining, by the detector circuit, that the predefined condition is not met for a predefined amount of time.

19. The method of claim 13, further comprising:
    overriding the indication to implement the traffic throttling policy by an agent that received the indication to implement the traffic throttling policy.

20. The method of claim 19, wherein overriding the indication to implement the traffic throttling policy by an agent that received the indication to implement the traffic throttling policy comprises:
    implementing a different traffic throttling policy by the agent that received the indication to implement the traffic throttling policy.

* * * * *